US005779274A

United States Patent [19]

Gallagher, Jr. et al.

[11] Patent Number: 5,779,274

[45] Date of Patent: Jul. 14, 1998

[54] BINGO GAME BOOKLET

[75] Inventors: John E. Gallagher, Jr.; Michael A. Singh, both of Lakewood; Gregory T. Pollock, Cleveland, all of Ohio

[73] Assignee: Arrow International, Inc.

[21] Appl. No.: 788,587

[22] Filed: Jan. 24, 1997

Related U.S. Application Data

[63] Continuation of Ser. No. 659,303, Jun. 6, 1996, which is a continuation-in-part of Ser. No. 367,975, Dec. 30, 1994, abandoned.

[51] Int. Cl.$^{6}$ .................................................. G09B 19/00

[52] U.S. Cl. ............................... 283/49; 283/50; 283/117

[58] Field of Search ............................... 283/117, 49, 52, 283/903, 50

[56] References Cited

U.S. PATENT DOCUMENTS 4,448,127 5/1984 Frain .
5,489,091 2/1996 Greer et al. .
5,607,145 3/1997 Lovell .

OTHER PUBLICATIONS 3 pages of 1987 Arrow International, Inc. catalog concerning Starburst paper (numbered R100043–45).
Schematic view of Arrow printing press (circa 1987).
Enlarged schematic view of Starburst belt print unit of printing press of Document AJ (circa 1987).
Blueprint concerning four color belt Cameron pringint machine (pre–1994).
Copy of Unimax paper prototype.
Schematic view of printing press employed to print the Unimax paper prototype of Document AJ.
Enlarged schematic view of a short belt printing press employed with the belt press arrangement of Document AK.
Arrow International Bingo Paper Catalog (©1992) pp. 1–16.
Arrow International Bingo Paper Catalog (©1994) pp. 1–22.

*Primary Examiner*—Willmon Fridie, Jr.
*Attorney, Agent, or Firm*—Fay, Sharpe, Beall, Fagan, Minnich & McKee

[57] ABSTRACT

A bingo game booklet includes a top sheet having at least one bingo face with a first serial number located on each bingo face of the top sheet wherein the first serial number is identical on each bingo face of the top sheet. A second sheet is located below the top sheet with the second sheet including at least one bingo face. A second serial number is located on each bingo face of the second sheet. The second serial number is identical on each bingo face of the second sheet and is also identical to the first serial number. A first indicium is located on the top sheet wherein each of the bingo faces is designated by the first indicium. A second indicium is located on the second sheet wherein each bingo face of the second sheet is designated by the second indicium. The first and second indicia are different. A connecting element connects an edge of the top sheet to an edge of the second sheet to form the sheets into a bingo game booklet. If desired, the booklet can have as many as thirty sheets arranged in a desired order.

27 Claims, 10 Drawing Sheets

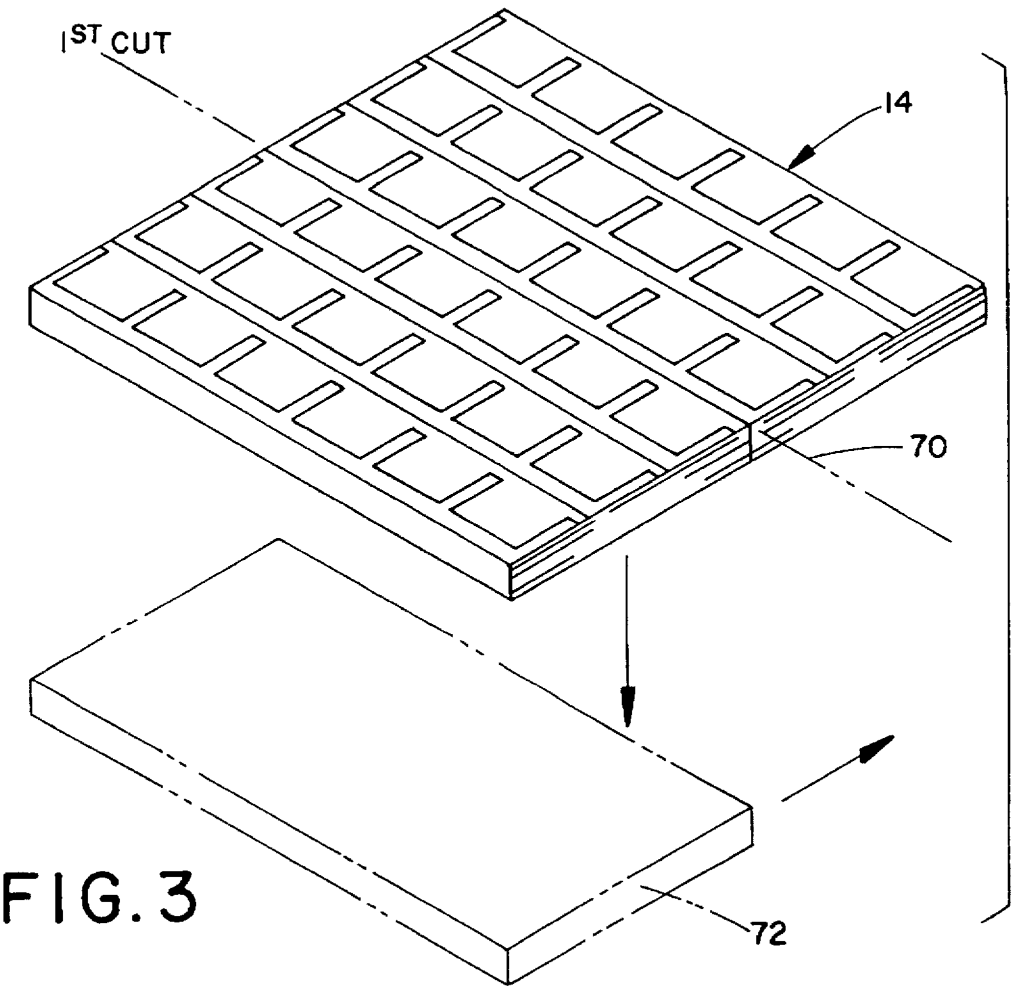
FIG.3
FIG.4
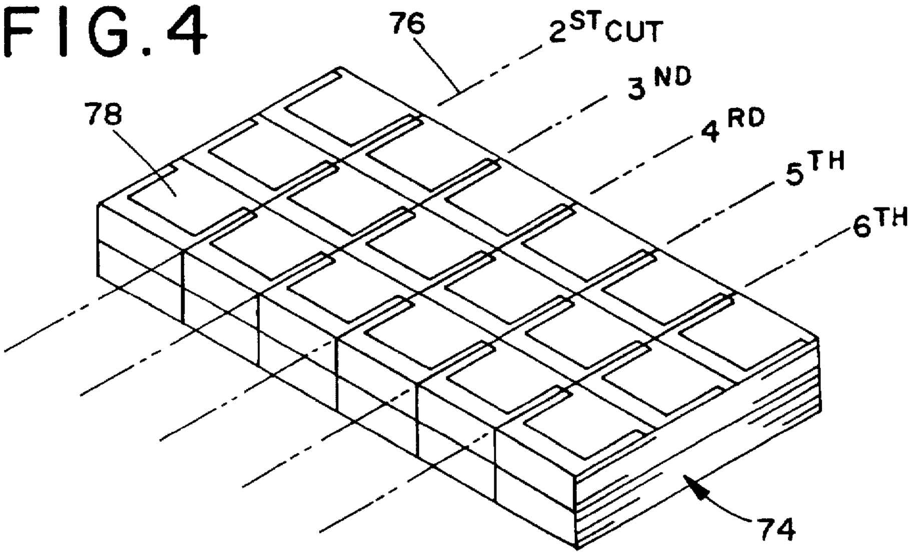

FIG. 5
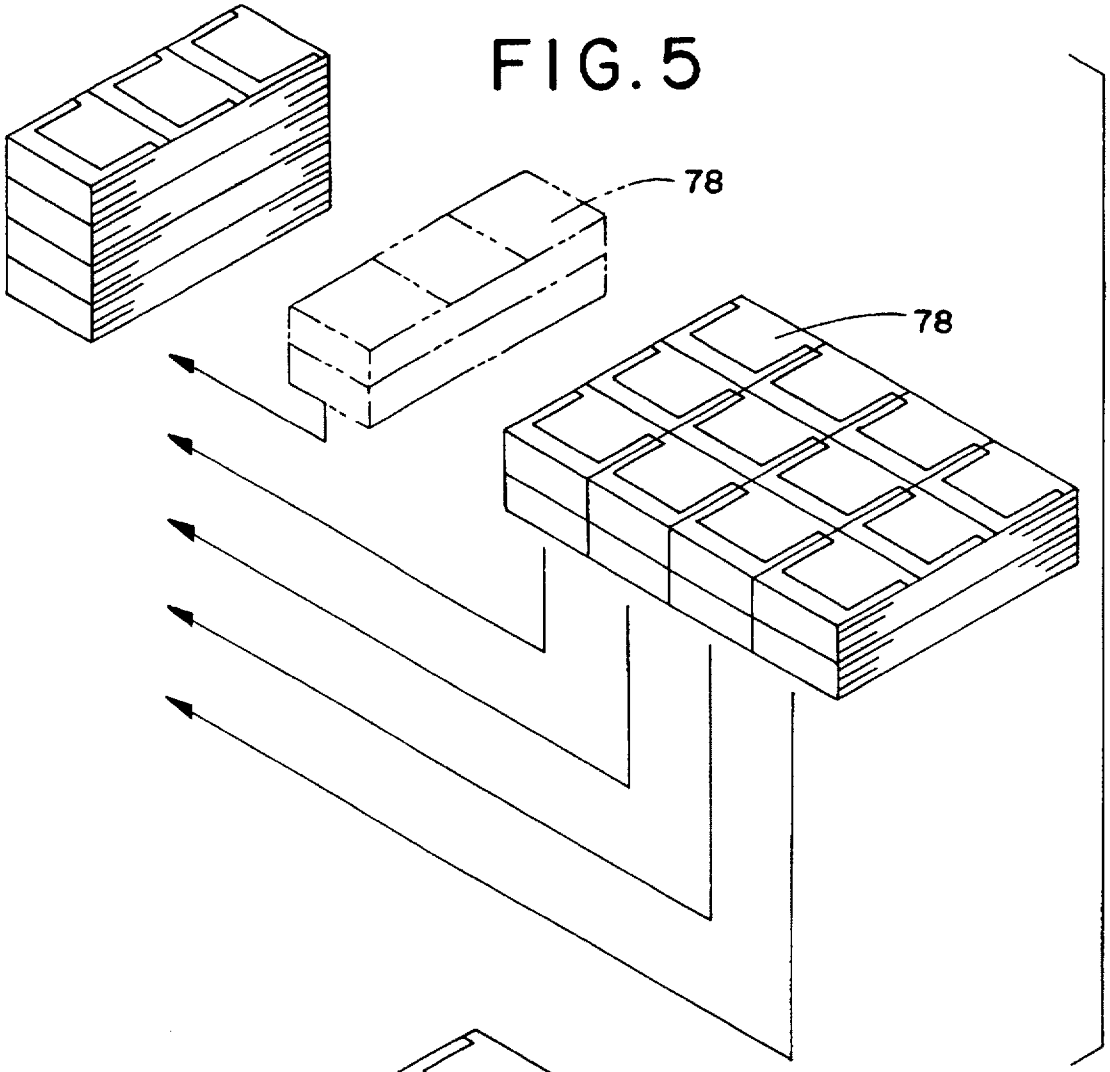
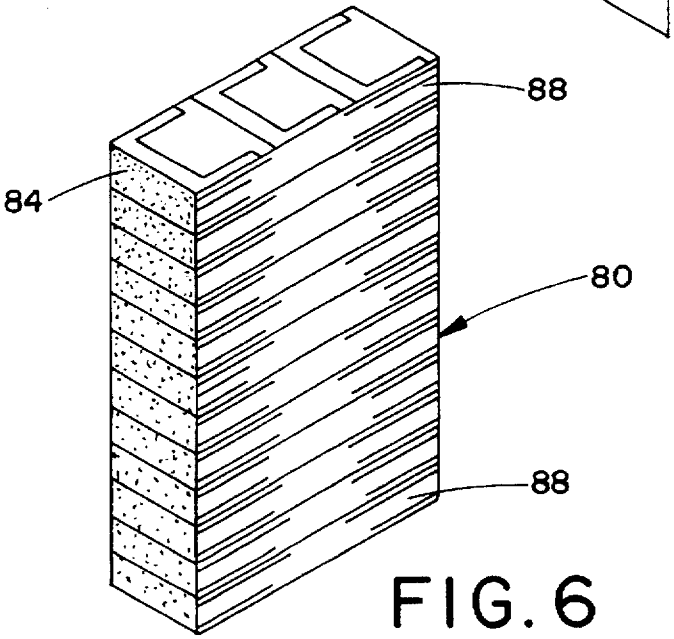
FIG. 6

BINGO GAME BOOKLET

BACKGROUND OF THE INVENTION

This application is a continuation of application Ser. No. 08/659,303 filed on Jun. 6, 1996 which is still pending and which is a continuation in part of Ser. No. 08/367,975 filed on Dec. 30, 1994 now abandoned.

The present invention relates generally to improvements in the printing and collating of sheets of paper. More particularly, the present invention relates to an improved collated game paper set having a plurality of game faces on each of a plurality of game sheets in the collated set of sheets.

While the invention will hereinafter be described particularly in connection with bingo sheet sets, it should be appreciated that the invention disclosed herein is amenable to broader use outside of the bingo field. For example, sheets produced according to the invention could be employed as various types of forms or checks, printed booklets or the like.

Bingo is a game of chance which has been played for many years in churches, schools and other charitable institutions. It is often a major source of revenue for such institutions. In the traditional bingo game, the player uses one or more cards, each of which has a bingo face employing a matrix of five vertical columns and five horizontal rows. One letter of the word BINGO is located at the top of each vertical column with a 5×5 matrix of numbers located below the letters such that five numbers between 1 and 15 are located beneath the letter "B"; five numbers between 16 and 30 are located beneath the letter "I"; four numbers between 31 and 45, and a free space are located beneath the letter "N"; five numbers between 46 and 60 are located beneath the letter "G" and five numbers between 61 and 75 are located beneath the letter "O." A bingo caller randomly selects balls numbered 1 through 75, calling out the selected numbers. Once a player has created a predetermined configuration of called numbers on his game card, he yells "BINGO" and wins the game. The specified prize is awarded once the winner's winning bingo face is verified.

Bingo players now often purchase booklets of bingo sheets with bingo faces printed thereon. These booklets comprise multiple sheets of bingo paper stacked one upon the other with the paper sheets being glued at one edge to form a booklet. The number of sheets in a booklet is indicated by the term "UP." Thus, a ten UP booklet means a booklet having ten sheets. Each sheet typically contains a number of bingo faces which can range from one to thirty-six or more faces. A respective one of these sheets is played, one at a time, during a bingo game. Common sheet configurations having multiple bingo faces include three vertically arranged faces, (known as a 3 ON vertical), three bingo faces horizontally positioned next to each other (known as a 3 ON horizontal), four bingo faces in a square configuration (known as a 4 ON), two sets of three vertically arranged bingo faces disposed side by side (known as a 6 ON vertical), two sets of three horizontally arranged bingo faces one disposed below the other (known as a 6 ON horizontal) and nine bingo faces in three side by side vertical columns of three bingo faces each (known as a 9 ON). In addition, several other conventional layouts are available, such as 2 ON and 18 ON.

When the player arrives at the bingo hall, instead of choosing individual hard cards, he purchases one or more booklets. Each booklet contains one sheet for each game of the evening. The player then plays all of the bingo faces on the first sheet for the first game and marks these sheets with an ink marker, or ink "dauber," as each of the numbers are called. Once a winner is declared and the game is over, the player merely removes the top sheet from the booklet and plays the next game on the second sheet. The marked first sheet is discarded.

As bingo has become more popular, bingo games have included as many as a thousand players, each one using twelve, eighteen, or more bingo faces simultaneously for anywhere from twenty to thirty games. A bingo hall operator can thus use up over 400,000 bingo faces in a single night.

Since a large number of people usually play bingo at the same time, it is highly desirable that each of the persons playing bingo have different non-duplicative bingo faces on their sheets in order to reduce the possibility that more than one person would win at the same time by having the identical bingo face. Therefore, it is desirable to be able to print a large number of different bingo faces on the sheets in order to reduce the occurrence of prize splitting.

A security problem also exists with bingo sheets. Players have been known to attempt to cheat in a particular bingo game by bringing in bingo paper from another game or from a prior session. The player would then claim to win by declaring a bingo on a sheet of paper not purchased at the beginning of the bingo game session, or not the sheet then being played in the stack of sheets. It would be advantageous, therefore, to allow the bingo hall operator to provide maximum game integrity and security so as to prevent such manipulation.

Currently, each booklet in a stack of bingo game booklets available for sale before a bingo session is separated from the adjacent booklets by a divider sheet. This enables the operator to readily detach each booklet from the stack for sale. However, the divider sheet adds to the weight of the stack of booklets. From the perspective of the bingo game operator, it would be desirable to reduce the weight of stacks of bingo game booklets distributed before each game. This would result in easier handling of the stacks of bingo game booklets by the operator of the bingo hall, as well as lessening freight costs and scrap or waste paper.

Accordingly, it has been considered desirable to develop a new and improved collated stack of sheets which would overcome the foregoing difficulties and others while providing better and more advantageous overall results.

BRIEF SUMMARY OF THE INVENTION

The present invention relates to a bingo game booklet.

A bingo game booklet according to the present invention comprises a top sheet including at least one bingo face with a first serial number located on each bingo face of the top sheet wherein the first serial number is identical on each bingo face of the top sheet. A second sheet is located below the top sheet with the second sheet including at least one bingo face. A second serial number is located on each bingo face of the second sheet wherein the second serial number is identical on each bingo face of the second sheet and the second serial number is identical to the first serial number. A first indicium is located on the top sheet for designating the at least one bingo face of the top sheet. A second indicium is located on the second sheet for designating the at least one bingo face of the second sheet. The first and second indicia are different. A connecting element is provided for connecting an edge of the top sheet to an edge of the second sheet.

Preferably, a plurality of additional sheets are located below the second sheet with each additional sheet including at least one bingo face. Each additional sheet preferably comprises a serial number located on each bingo face of that sheet, wherein the serial numbers located on such additional sheets are identical to the first serial number. Preferably each additional sheet further comprises an indicium designating such additional sheet wherein the indicium located on each additional sheet is different from the indicium located on any other additional sheet.

If desired, a non-stick coating can be located on at least a portion of the top sheet. Preferably the booklet further comprises an audit coding located on the top sheet wherein the audit coding identifies the booklet. The audit coding can comprise a bar code which contains the serial number. In addition, the audit coding can comprise a bar code which contains an audit number for the booklet. If desired, the audit coding can comprise a bar code which contains information relating to a cut type of the booklet. Also, if desired, the audit coding comprises a bar code which contains information relating to the number of sheets in the booklet.

One advantage of the present invention is the provision of a new and improved bingo game booklet.

Another advantage of the present invention is the provision of a common tracking serial number on each bingo face on each sheet of a set of sheets collated into a booklet and each booklet distributed before the beginning of the bingo session. This provides maximum security to the game by enabling the proprietor of the game to easily track the serial number of the booklets and stop a player from bringing in bingo paper from another game.

Still another advantage of the present invention is the provision of a common indicium for each bingo face on a given sheet and different indicia for each of several sheets of a bingo game booklet. The several booklets distributed at the beginning of a bingo session are collated to have the same sequence of indicia. This arrangement will stop a player from declaring a bingo using a sheet from a prior session of the game and enables better visual control for floor workers during a bingo game. If desired, the indicia can be colors which can be printed in a frame-like border around a bingo matrix. Alternatively, the indicia can be numbers, such as page numbers.

Yet another advantage of the present invention is the provision of a plurality of booklets each comprising a collated set of sheets wherein the plurality of booklets are separated from one another by a glue resistant coating on the top sheet of each booklet. The glue resistant coating eliminates the need for the wax sheet conventionally used to separate bingo booklets. This results in less weight and waste paper per carton of bingo booklets, easier handling and lower freight costs.

Yet still another advantage of the present invention is the provision of audit coding located on at least each top sheet of each bingo game booklet in a stack of such booklets. This simplifies the tracking of sales and inventory and allows the game proprietor to maintain reliable accounting records. However, the same audit number can be printed on each sheet of a booklet if so desired. The audit coding can be in the form of a bar code including information concerning the serial number printed on the bingo faces, an audit number of the booklet, a cut type (i.e. 3 ON vertical, 6 ON horizontal, 18 ON, etc.) and the UP or number of sheets in the booklet. Alternatively, the audit coding can comprise consecutive audit numbers.

A further advantage of the present invention is the provision of a bingo sheet having at least one bingo face which is designated by a first indicium and wherein a second indicium is employed to designate the series of bingo faces from which that particular bingo face is taken.

A still further advantage of the present invention is the provision of a bingo sheet having at least one bingo face designated by an indicium which borders the bingo face such that the numerals of the bingo matrix remain prominently visible. Preferably, different color borders are used as the indicium and a white background is maintained on which the bingo matrix is set out in black numerals so that the numbers in the bingo matrix are clearly visible.

Still other advantages of the present invention will become apparent to those skilled in the art upon a reading and understanding of the following detailed specification.

BRIEF DESCRIPTION OF THE DRAWINGS

The invention may take form in a certain structure, a preferred embodiment of which will be described in detail in this specification and illustrated in the accompanying drawings. In the drawings:

FIG. 3 is a perspective view of a first cut made in the collated set of master bingo sheets of FIG. 1;

FIG. 4 is a perspective view of a second series of cuts made in the stack of bingo sheets of FIG. 3 to arrive at separate bingo game booklets;

FIG. 5 is a perspective view of a stacking sequence for the stack of booklets of FIG. 4;

FIG. 6 is a perspective view of a final assembled stack of bingo game booklets;

DETAILED DESCRIPTION OF THE PREFERRED EMBODIMENT

Figure 1:
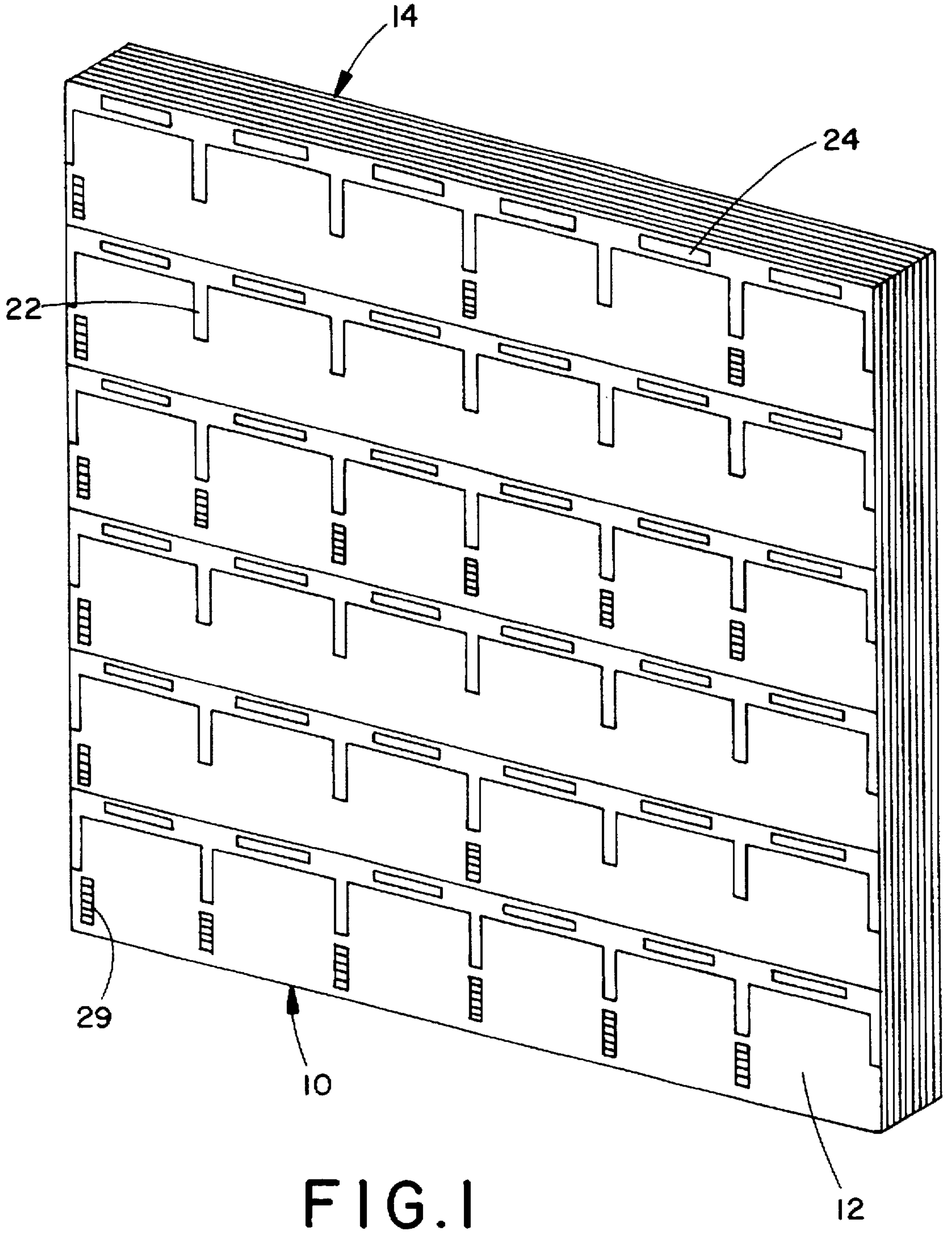
FIG. 1 is a perspective view of an uncut set of master bingo sheets with each master sheet having thirty-six bingo faces thereon.

Referring now to the drawings, wherein the showings are for purposes of illustrating a preferred embodiment of the invention only and not for purposes of limiting same, FIG. 1 shows a plurality of printed master bingo sheets 10. Each of the sheets is of a square configuration and comprises a plurality of bingo faces 12. More specifically, an array of 6×6 bingo faces, therefore, thirty-six in all, is illustrated in FIG. 1. A plurality of such sheets are printed with unique combinations of bingo numbers being employed for each bingo face. The successive sheets 10 are printed and stacked into a stack 14.

The method of printing the sheets 10 forms no part of this invention as any number of ways of printing the sheets could be provided. Similarly, any number of ways of assembling the sheets 10 into the stack 14 could be used and the method for doing so forms no part of this invention. While the sheet 10 illustrates an array of 6×6 bingo faces, it should be appreciated that any other suitable number of bingo faces could be present on the master sheet. One such known array is a set of twenty-four bingo faces known as a 24 ON layout.

Figure 2A:
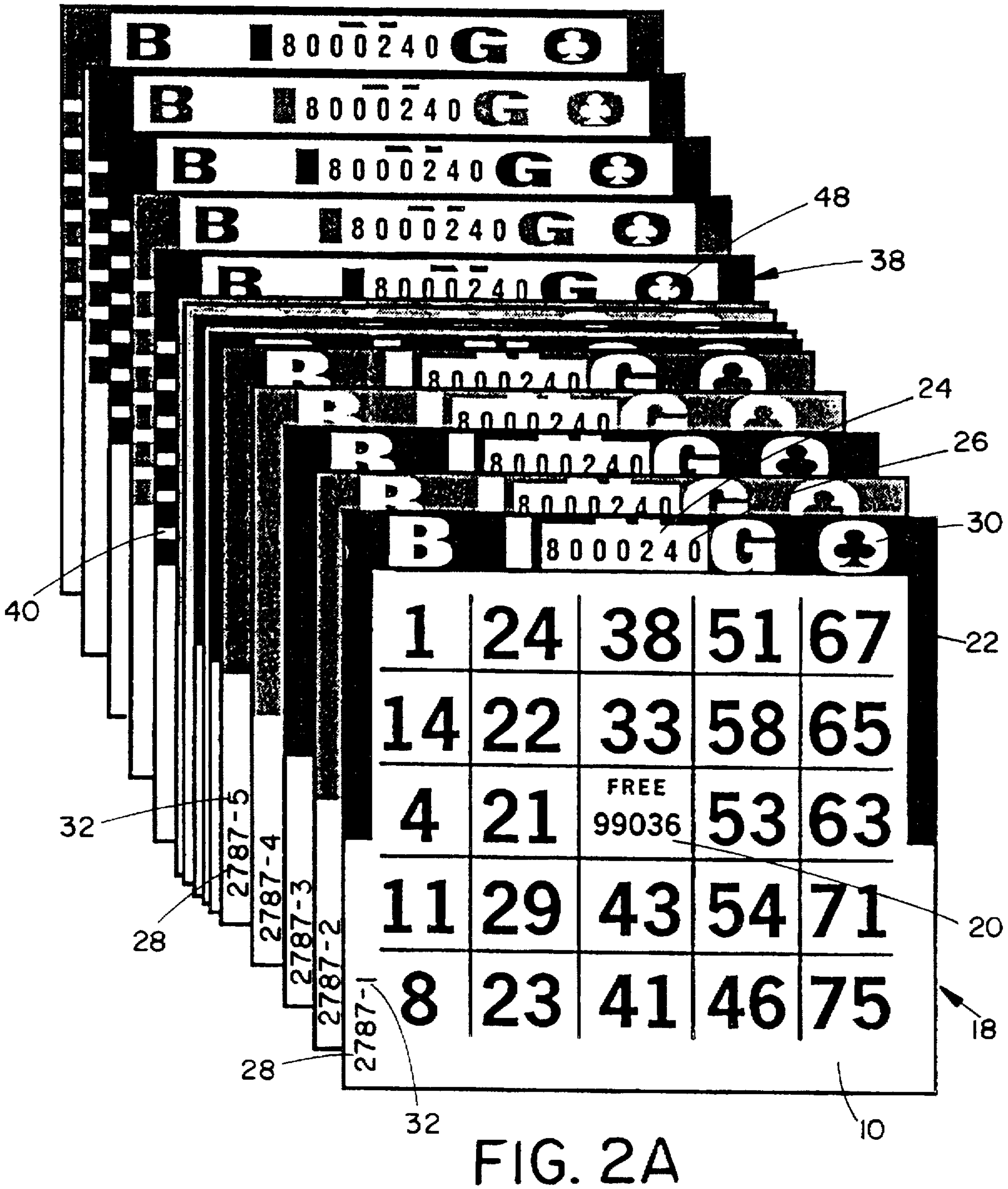
FIG. 2A is a perspective view of a series of bingo faces on a plurality of sheets of a collated set of bingo sheets, the top sheet illustrating a first indicium.

With reference now to FIG. 2A, a series of bingo faces, each on a respective one of a series of sheets, are illustrated in FIG. 2A. The first of these faces 18 will be discussed herein. This bingo face 18 comprises a square 5×5 array of different bingo numbers having a central free space 20 in which a free space identification number can be printed. The bingo face is also provided with an indicium 22 identifying the bingo face. The indicium is illustrated as a solid color border extending around the top and the upper halves of the two sides of the bingo face. Located in the center of the indicium is an uncolored rectangular box 24 in which a serial number 26 is printed.

As is evident from FIG. 2A, the serial number 26 is a seven digit number which is unique to the series of bingo faces on the sheets of the stack 14 illustrated in FIG. 1. In other words, the same serial number is printed adjacent each bingo face on each of the sheets 10 in the stack 14. It should be appreciated that eight digit serial numbers can be used instead of seven digit numbers. Preferably, the serial number is printed in the top center of each bingo face, as is illustrated in FIG. 2A, and preferably in a different color than the bingo face. The serial number is a unique identifiable characteristic of the bingo face and enables the bingo hall operator to provide maximum game integrity and security so as to prevent manipulation of the game by a player attempting to bring in bingo paper from another game. With the serial number, the proprietor can track the allegedly winning bingo face and see whether the sheet on which it is located was sold to the player at the beginning of the bingo session.

The bingo face 18 is located on the first sheet of the set of sheets in a bingo game booklet according to the present invention. Printed on the first sheet adjacent the bingo face is an audit number 28. If desired, a series identification symbol 30 can be provided for each bingo face. The illustrated symbol is a club. Obviously, a large variety of other symbols can be employed to indicate which series of bingo faces the bingo face of the sheet belongs to. Bingo faces are generally organized into series of 9000 faces, e.g., 1–9000; 9001–18,000 and so on. The symbol 30 shows what series the bingo face belongs to. It is planned that the series identification symbol would be visible on each bingo face on each sheet.

Each of the bingo faces 12 on the sheet 10 illustrated in FIG. 1 can be of the type shown in FIG. 2A with the exception that the audit number is only present on certain of the bingo faces 12 on the first sheet 10 as is evident from FIG. 1. The audit numbers are employed only on faces which would comprise a selected face of one of a predetermined set of configurations of bingo faces, e.g. 3 ON, 6 ON, 9 ON or 18 ON wherein the audit numbers would be progressively higher on successively lower booklets of the final bound set of booklets. If desired, the same audit number could appear on each sheet of a booklet, with consecutive audit numbers appearing on consecutive booklets. Printing an audit number on each sheet of the set of bingo sheets enables the proprietor to double check that that particular sheet, if it is presented as having the winning bingo face, was sold at the beginning of that evening's bingo session.

Instead of employing an audit number 28 of the type illustrated in FIG. 2A, it is contemplated by the invention that one could instead employ a bar code such as is illustrated schematically in FIG. 1 and identified by the numeral 29. Such a bar code can contain eight digits for a serial number, four digits for an audit number, two digits for the cut type (i.e. 3 ON vertical, 6 ON horizontal, 18 ON etc.) of the booklet produced from the sheets and two digits for the UP or number of sheets in the booklet. Using an alphanumerical bar code, the sixteen digits of numerical information mentioned previously can be represented in less than sixteen alphanumeric digits. For example, using a known Mod 47 Compression Scheme, the sixteen numerical digits of information can be represented in ten alphanumeric characters with an eleventh digit being employed as a check digit.

The bar coded information can be used in conjunction with an accounting program which is tied to the cash register at which the bingo booklets are being sold in order to scan and track exactly which bingo booklets have been sold. This is important because the majority of bingo revenue (excluding pull tabs) is generated when the players purchase bingo booklets for a bingo session before the session begins. As players enter the bingo hall and purchase the booklets, the bar codes can be scanned. This information can be stored in a master database. Thereafter, the bingo hall as well as government agencies, will be able to track the number of booklets sold and determine exactly which booklets have been sold from each of several sets of bingo paper which may be used simultaneously.

Storing the information by serial number, the hall can determine the number of booklets sold per set. The cut type or ON and the number of sheets per booklet or UP can be used to determine the costs of different booklets if the hall offers several different types of booklets which can be played simultaneously. For example, a player may be able to purchase a 3 ON 10 UP for $5.00 or a 9 ON 10 UP for $10.00. Therefore, the total revenue generated by the bingo hall can be tracked. Finally, if a bingo series is entered for each type of booklet, the audit number which is unique to each booklet can be used to determine exactly which bingo faces should be in play for each game of a session.

For example, knowing that a 3 ON 10 UP booklet with audit number 1 was sold from a series of bingo faces sold by Arrow International known as the 99,036 series, it can be easily determined that faces 90,001, 90,501 and 91,001 will be in play for game number 1. Thereafter, faces 90,011, 90,511 and 91,011 will be in play for game number 2, etc. This will further prevent a player from claiming to have a winning bingo face while playing a booklet not purchased for that session.

Since a set of bingo booklets typically comes in several boxes, a hall will sometimes incorrectly use a box out of sequence and employ booklets from two different sets of paper. Bar coding the bingo paper will prevent such errors. The audit tracking feature with the bar code 29 will also allow a hall to monitor exactly which bingo faces are present in the booklets sold and prevent the selling of duplicate booklets for a single session since a suitable software program can inform the checkout clerk that the booklet presented by a customer for purchase has been previously sold for that session albeit with a different serial number.

Selling booklets with duplicate bingo faces is illegal in some states and causes ill will among players. With the use of a bar code identifying each booklet sold by serial number, audit number, cut type and number of sheets, these problems can be avoided.

Instead of, or in addition to, the indicium 22, one could provide on each bingo sheet numerals such as the numeral 32 illustrated in FIG. 2A. These numerals could be printed alongside the audit numbers 28 so that one such numeral would appear on each bingo sheet when it is finally cut and stacked adjacent the audit number of that booklet. The numerals could be printed in ascending order so that the first sheet of the bingo booklet would have the numeral 1, the second sheet would have the numeral 2, the third sheet would have the numeral 3 and so on. In other words, the bingo booklet sheets would be page numbered or game numbered from 1 to, e.g., 25 if there are 25 sheets in the booklet. Numbering the bingo sheets of each booklet may be advantageous to the proprietor of the bingo game to double check that the winning bingo face is presented on the bingo sheet then in play at the bingo hall. The page number or game number on the bingo sheet would be useful for people who are color blind and could not distinguish one color indicium 22 from another.

Figure 2B:
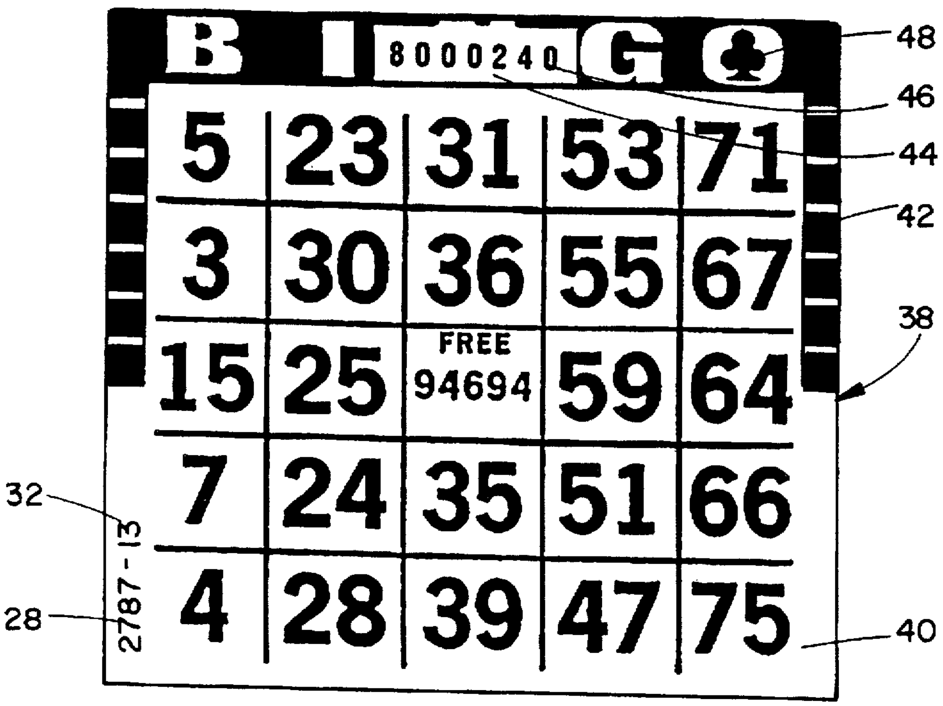
FIG. 2B is an enlarged front elevational view of another bingo face on another sheet illustrating a second indicium.

FIG. 2B illustrates a different bingo face 38 located on a different bingo sheet 40. It is evident that FIG. 2B illustrates a bingo face 38 having an indicium 42 which is different from the indicium 22 of FIG. 2A. More specifically, the indicium 42 is a striped border in comparison with the indicium 22, which is of a solid design. The sheet 40 is located behind the sheet 10 in the booklet illustrated in exploded perspective view in FIG. 2A. It is evident that a series of such sheets are secured together to form the booklet. Located in the indicium 42 is a rectangular box 44 in which a serial number 46 is printed. It should be evident that the serial number 46 is identical to the serial number 26 of FIG. 2A. A series identification symbol 48 is also provided. This can be the same as on the first sheet, i.e., a club, as illustrated in FIG. 2B or can be a different symbol depending on the series concerned. The same audit number 28 is printed on the bingo sheet 40 as was printed on the bingo sheet 10 illustrated in FIG. 2A. In addition, a page number 32 which is different from the page number printed on the bingo sheet 10 is printed adjacent the audit number 28.

Figure 2C:
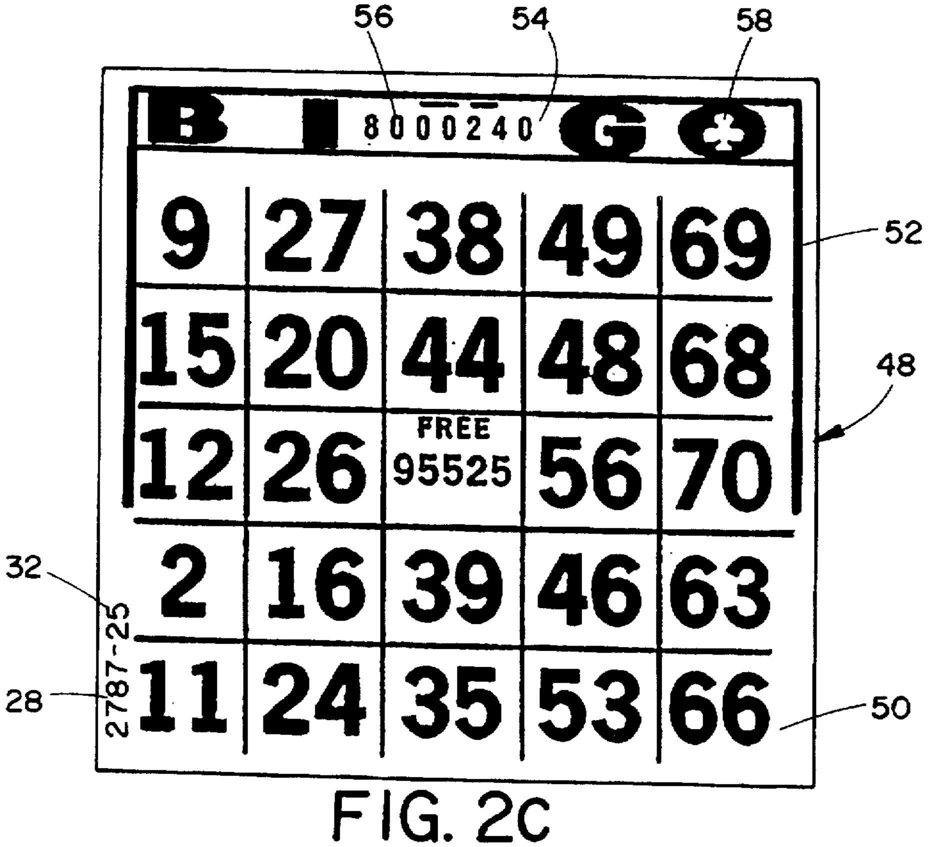
FIG. 2C is an enlarged front elevational view of still another bingo face on still another sheet illustrating a third indicium.

Similarly, FIG. 2C illustrates a third bingo face 48 on a third sheet 50. This bingo face has a yet different indicium 52. More specifically, the indicium 52 is a thin line border around the top of the bingo face 48 and around the upper halves of the two sides thereof. It is evident from a comparison of FIGS. 2A, 2B and 2C that the borders are significantly different in appearance from each other so as to be readily visible for a floor monitor working the bingo hall to insure that all of the players for a particular bingo game are on the same page of the bingo game booklet.

With reference again to FIG. 2C, the bingo face 48 can contain a central box 54 in which a serial number 56 is printed. The serial number 56 is identical to the serial number 26 of FIG. 2A and 46 of FIG. 2B. In addition, the third bingo face 50 can have a series identification symbol 58. This symbol can be identical to the club symbol illustrated in FIGS. 2A and 2B, as it is in this case, or it can be a different symbol. The same audit number 28 is printed on the bingo sheet 50. Printed adjacent the audit number 28 is a page number 32 which is different on bingo sheet 50 from the page number printed on bingo sheet 40 which, again, is different from the page number 32 printed on the bingo sheet 10.

Preferably, the indicia for each of FIGS. 2A, 2B and 2C can be printed in each of a plurality of separate colors. Such colors can, if desired, be, in order, blue, orange, green, yellow, pink, grey, olive, brown, red, purple, black and aqua. Preferably, twelve solid border colors are employed as the indicia for the first twelve sheets as illustrated in FIG. 2A. Then striped borders, as illustrated in FIG. 2B, are employed in each of twelve colors as the indicia for the next twelve sheets. Subsequently, slim line borders can be employed, as illustrated in FIG. 2C, as the indicia in each of six colors for the next six sheets, if desired. This would create a 30 UP booklet. Obviously, the number of colors and borders employed and the order in which these are employed for the indicia can vary depending upon the number of sheets utilized in the booklets prepared according to the present invention. Also, while a booklet of thirty sheets has been discussed immediately hereinabove, it should be appreciated that a booklet with any other suitable number of sheets from two on up to fifty or one hundred sheets can be produced, if so desired. In addition, a plurality of other colors in a variety of other sequences can also be provided, if desired. Furthermore, while borders of different configurations have been disclosed in FIGS. 2A, 2B and 2C as the indicia, it should be appreciated that other types of indicia could be used for the bingo faces on the sheets in the stack 14. For example, one could employ numerals as the indicia so that each of the bingo faces on the first sheet, or at least the sheet itself, would be identified by the numeral 1, each of the bingo faces on the second sheet, or the sheet itself, would be identified by the numeral 2 and so on.

With reference now to FIG. 3, the stack of sheets can be collated in such a way that the border colors are in the precise order mentioned; blue, orange, green, yellow, pink, grey, olive, brown, red, purple, black and aqua for each of the three different types of borders illustrated in FIGS. 2A, 2B and 2C. Thirty sheets can thus be provided in the collated stack 14 shown in FIG. 3. It should be appreciated that a common tracking serial number is provided on each bingo face of each of the thirty sheets in the set of sheets illustrated in FIG. 3. This provides maximum security to the game by enabling the proprietor of the game to easily spot a player who has declared a bingo using paper bought at a previous game and thereby deny such player the jackpot.

The stack 14 is then cut into the desired bingo face sheet configuration. One such configuration is illustrated in FIGS. 4–6. The main stack 14 is cut along a first cut line along a vertical medial axis 70 to divide the stack into a pair of similar substacks 72. Each of the substacks contains eighteen bingo faces arranged in six horizontally spaced rows of three vertically oriented faces each. The two resulting substacks can then be superimposed one on the other to produce a second stack 74 which is twice the thickness of the first stack 14. The stack 74 is then cut by five horizontally spaced vertical cut lines 76 to produce six substacks 78 of sets of three vertically spaced bingo faces. As shown in FIG. 5, the left hand substack 78 is transferred to underlie the right hand substack and the remaining substacks are transferred so that the lower substacks underlie the next successive upper substack. The several substacks 78 are then assembled into a final stack 80.

The several sheets in the final stack are adhered together along one edge thereof by means of an adhesive layer 84, as illustrated in FIG. 6 to create a bound stack of bingo game booklets 88 for sale by a bingo hall operator. A conventional adhesive is applied by conventional means.

Figure 7A:
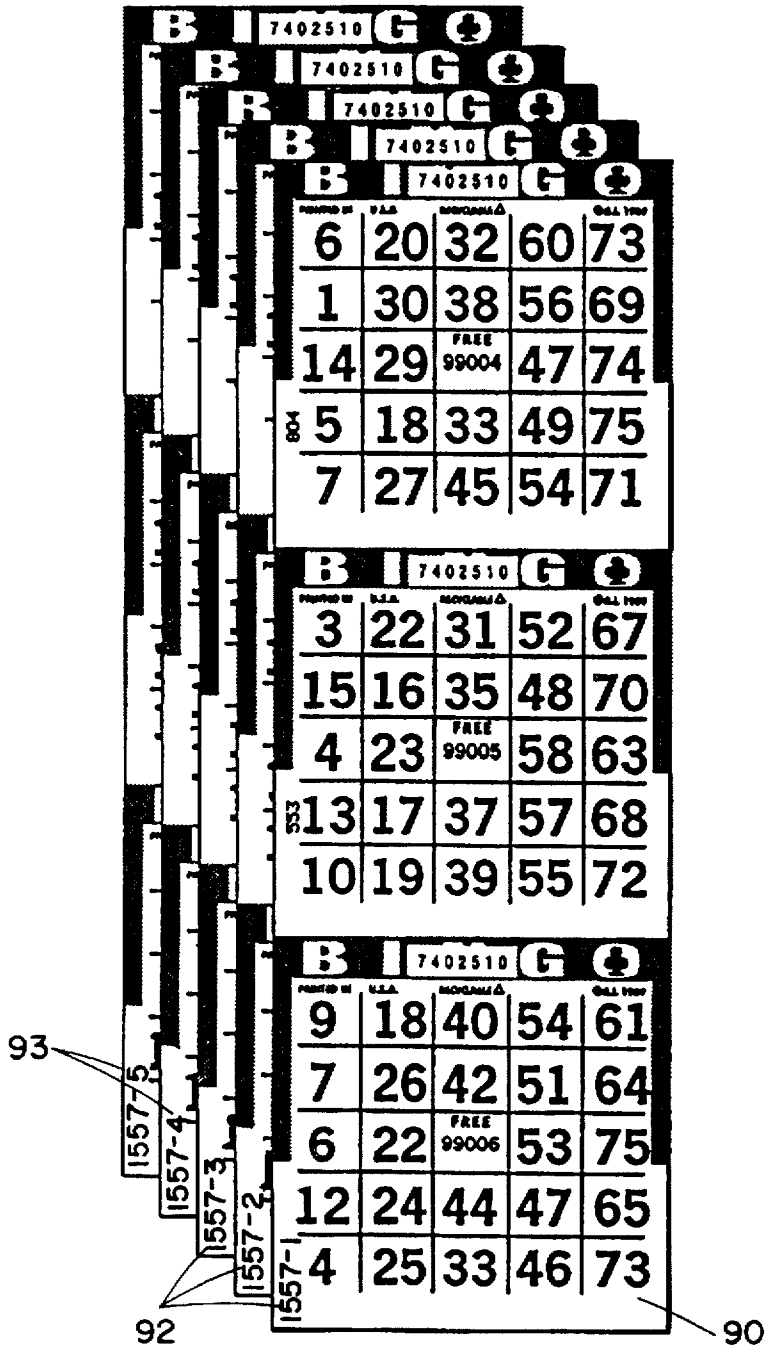
FIG. 7A is a perspective exploded view of a series of 3 ON vertical bingo sheets of a booklet of FIG. 6.

Each of the bingo game booklets includes a plurality of sheets. The first few of these sheets is illustrated in exploded form in FIG. 7A. As can be seen, a sheet 90 includes three vertically spaced bingo faces. Each face is identified by an indicium which is common to all the faces on the sheet 90. The indicium is shown to be a solid color border. Also, each face has the same serial number. The sheet 90 also includes an audit number 92 for the 3 ON vertical configuration. The same audit number 92 could be printed on each sheet of the set of bingo sheets, as is illustrated in FIG. 7A. The other audit numerals illustrated on the top sheet 90 are not relevant to this configuration. In addition, a page number 93 can be printed on each of the bingo sheets in the booklet such that the page numbers are consecutive on the sheets of the booklet as is illustrated in FIG. 7A.

Each succeeding sheet similarly contains three bingo faces with the same serial number. However, each sheet has a different indicium designating the bingo faces on that sheet. The first of these sheets would then be played during the first bingo game in the bingo session. When the first bingo game is over, the first sheet 90 would be simply torn off and the second sheet—which has the same audit number, but is identified as page number 2—would then be played during the next bingo game by the players of the game.

Figure 7B:
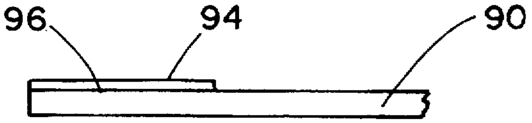
FIG. 7B is a greatly enlarged side elevational view of an upper end of a first sheet of the series of sheets of FIG. 7A.

With reference now to FIG. 7B, preferably the first sheet 90 has on it at least one stripe 94 of an adhesive resistant material, such as, e.g. wax, PTFE or certain types of oils or silicones, layered atop the upper edge 96 of the sheet. The layer of adhesive resistant material 94 prevents the adhesive 84 from penetrating the sheet 90. This, in turn, allows the booklets 88 in the master stack 80 to be separated from each other along the top sheet 90 of each booklet because when the stack of sheets is fanned, the booklets will readily break from the stack 80 at the adhesive resistant coatings so that separate booklets 88 can be formed from the master stack. In this way, each of these booklets is then available for sale at the beginning of the bingo session in a bingo hall. As mentioned, only the bingo sheet at the top of each booklet is provided with an audit numeral identifying that booklet in the stack of booklets. This enables the hall operator to monitor how many booklets have been sold for that night's bingo session. Rather than using an audit number, audit coding in the form of a bar code could be provided as explained previously.

It is contemplated that each bingo face on each sheet 10 of the stack 14 has the same serial number printed on it so that the booklets 88 produced have the same serial number printed on each bingo face of each sheet. Such booklets are then distributed at the beginning of a bingo session. The serial numbers enable the proprietor of the game to verify that each winner has bought the bingo paper at the beginning of the bingo session. Different bingo sessions would generally be played with booklets having unique non-repeating seven or eight digit serial numbers so that each session can be accurately monitored simply by tracking the serial number.

While the illustrated cutting and stacking sequence resulted in a 3 ON vertical sheet such that each sheet has three bingo faces, one vertically positioned below the other, it should be appreciated that the cutting and stacking sequence could be performed in a variety of other configurations so as to result in, e.g. a 3 ON horizontal sheet, a 4 ON sheet, a 6 ON vertical sheet, a 6 ON horizontal sheet and so on. In this regard, reference is made to U.S. Pat. No. RE 34,368 which is owned by the assignee of the present invention. That patent is incorporated herein by reference in its entirety.

Figure 8A:
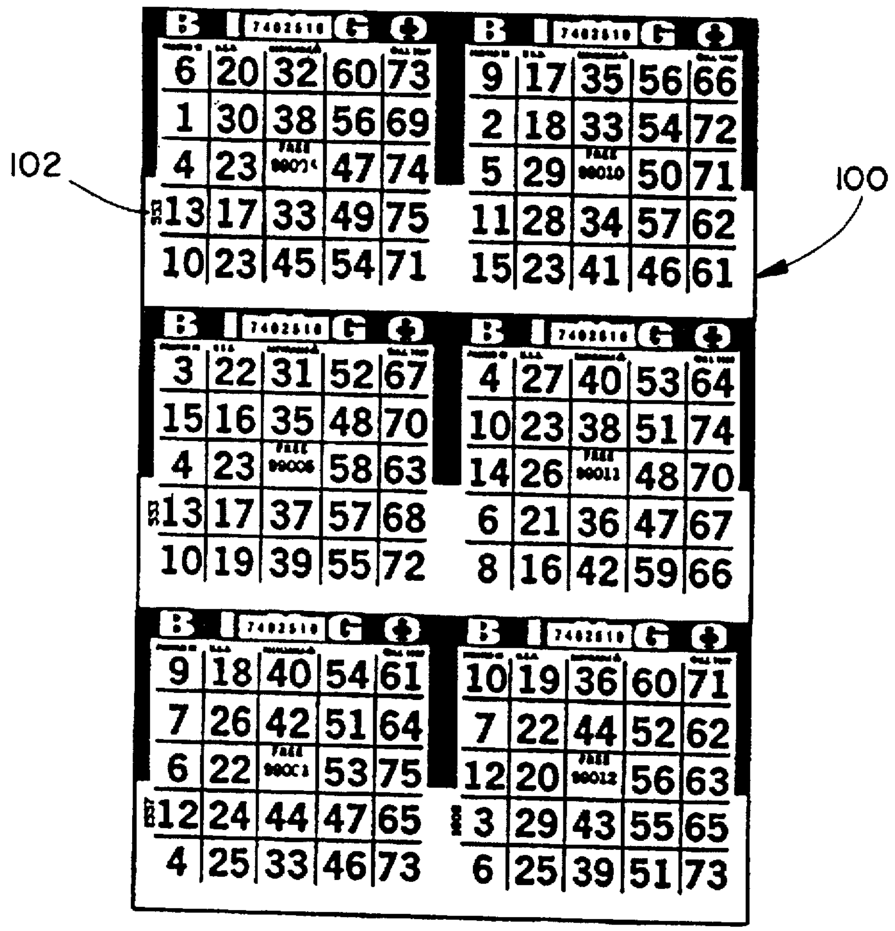
FIG. 8A is a front elevational view of a 6 ON vertical bingo sheet which could be cut from the master sheet of FIG. 1.

With reference now to FIG. 8A, another bingo sheet which could be cut from the set of sheets 14 illustrated in FIG. 1, is a 6 ON vertical sheet 100. A top sheet of a bingo game booklet for this game is there illustrated. All the bingo faces have the same serial numeral and the same indicium, a solid border. This sheet includes an audit numeral 102 relating specifically to the 6 ON vertical bingo game booklet. It should be noted that the other audit numerals printed on sheet 100 are not relevant to the 6 ON sheet.

Figure 8B:
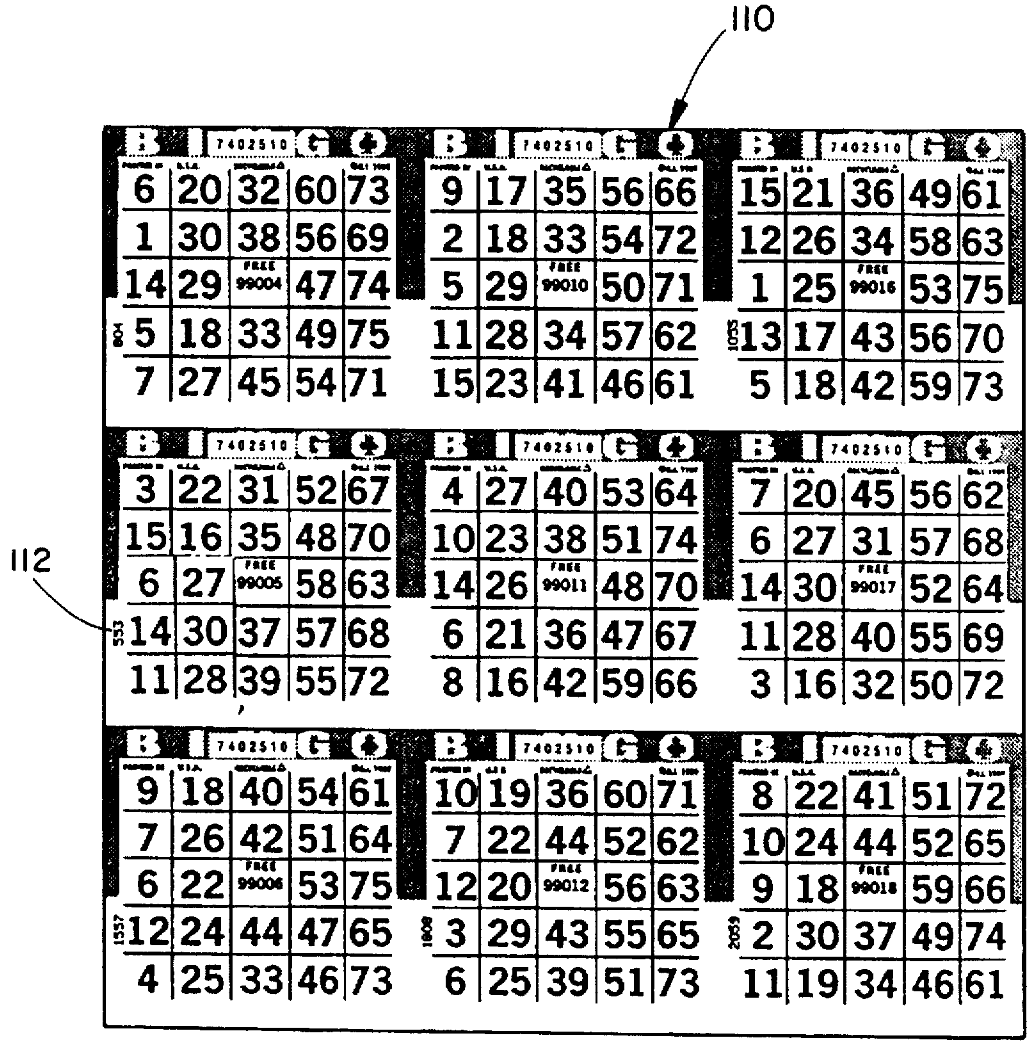
FIG. 8B is a front elevational view of a 9 ON bingo sheet which could be cut from the master sheet of FIG. 1.

With reference now to FIG. 8B, a top sheet 110 of a 9 ON bingo sheet, which can be cut from the master stack 14, is there illustrated. Each face bears the same serial numeral and the same indicium. A unique audit numeral 112 is provided on the sheet 110 of the bingo game booklet so produced. The other audit numerals on the sheet are not relevant to this configuration.

Figure 8C:
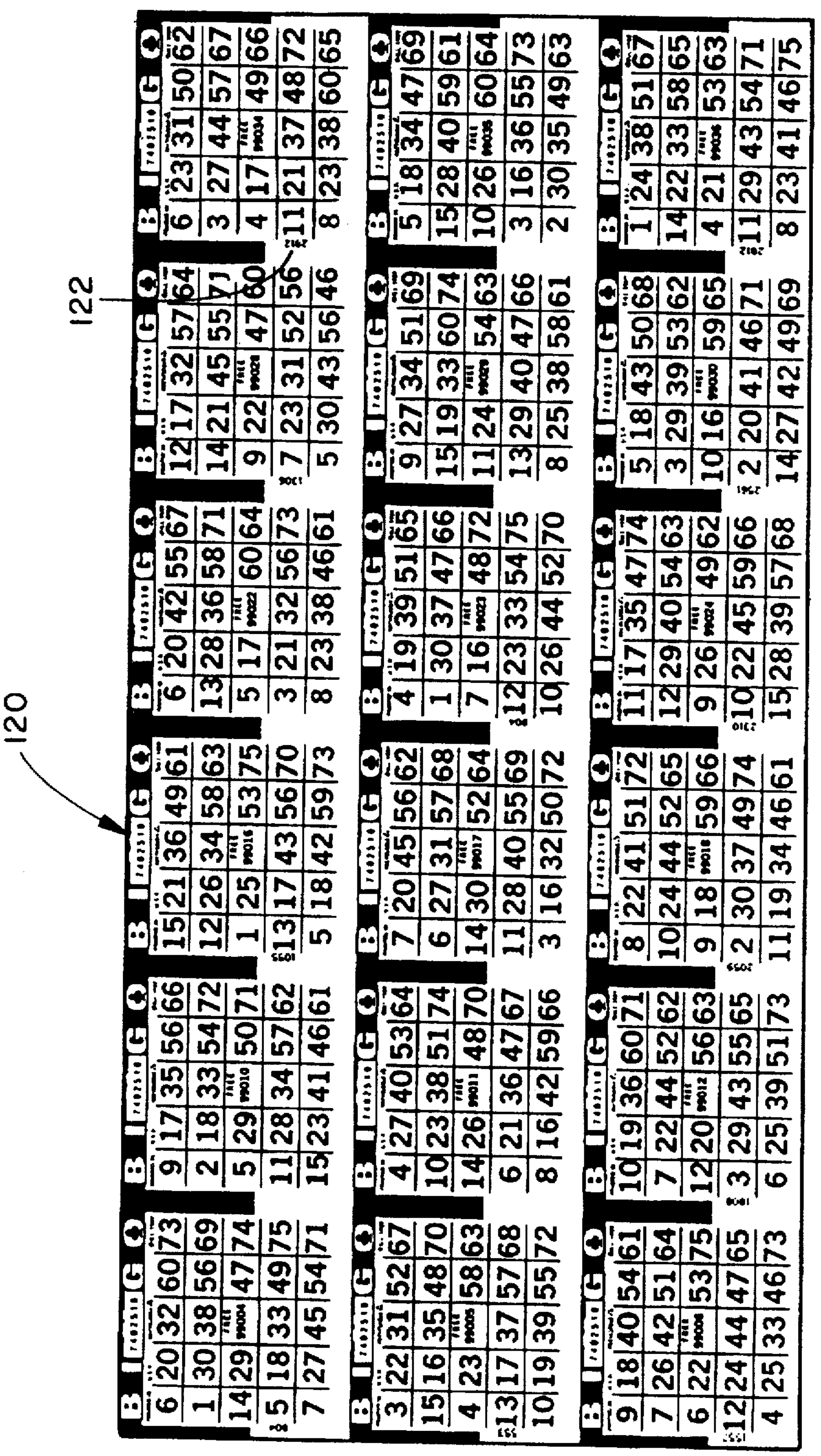
FIG. 8C is a front elevational view of an 18 ON bingo sheet which could be cut from the master sheet of FIG. 1; and, FIG. 9 is a perspective view of a booklet according to another embodiment of the present invention.

Finally, with reference to FIG. 8C, an 18 ON sheet 120 is there illustrated. This sheet can also be produced from the master stack of sheets 14 by cutting the stack once along the first cut line 70, as is illustrated in FIG. 3, to produce the two substacks 72. The bingo sheet 120 is the first sheet in the booklet and is identified by an audit numeral 122.

It should be appreciated that for each of the examples illustrated in FIGS. 7A, 8A, 8B and 8C, a successively lower audit numeral is provided on the sheets of each successively lower booklet manufactured from the master stack 14 illustrated in FIG. 1. This enables the game proprietor to easily audit how many booklets were sold at the beginning of each bingo session. However, the same serial numeral is employed for each bingo face on each sheet. Also, different indicia are employed on different sheets to designate all the bingo faces of that sheet. But the same sequence of indicia is used in each booklet in the stack so that all the players purchase booklets having the same sequence of indicia on the several sheets of their booklets.

Figure 9:
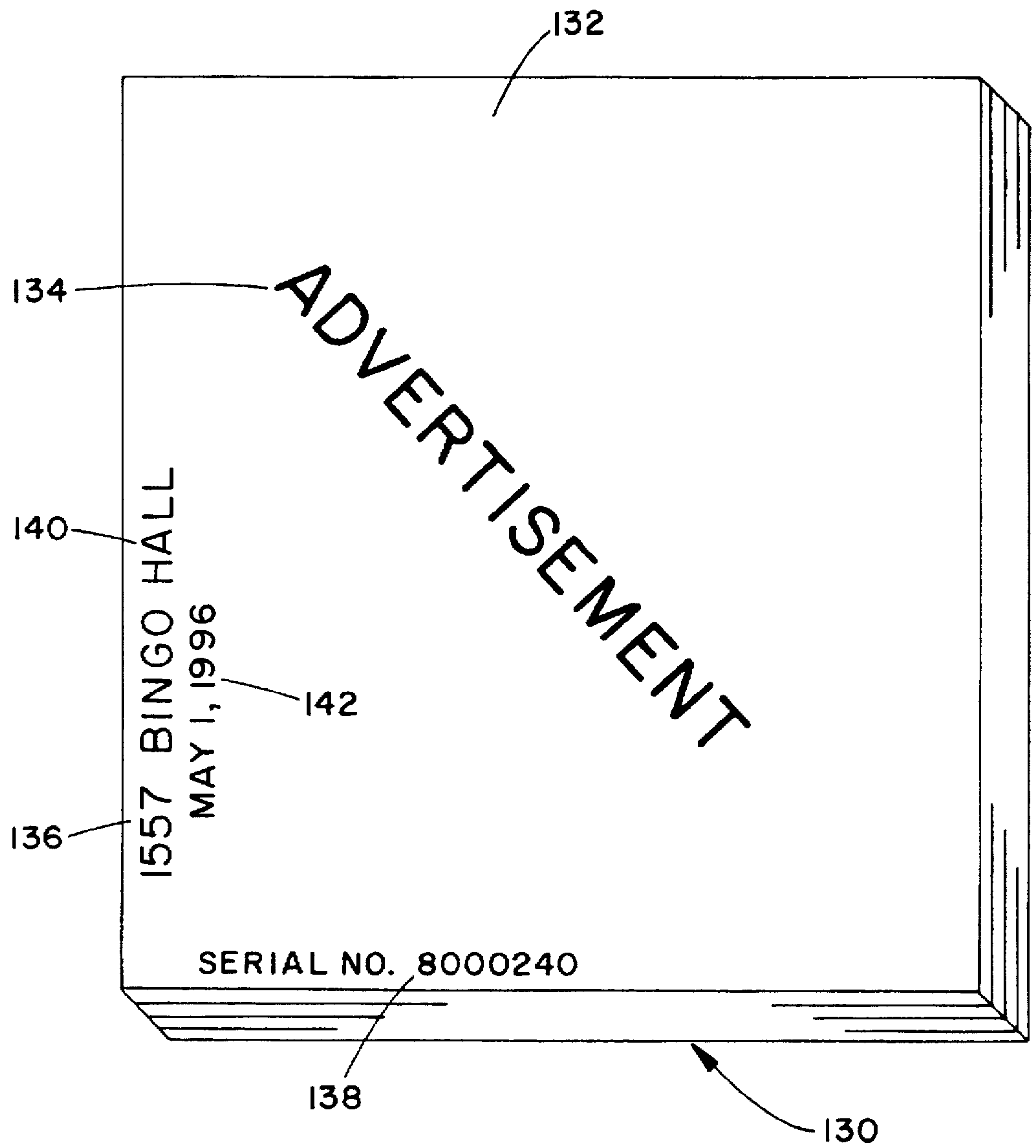

An audit number can be printed on the bingo booklet top sheet when that top sheet is a cover sheet which contains only advertising and no bingo faces. This embodiment is illustrated in FIG. 9. There a booklet 130 includes a cover sheet 132 which contains advertising as at 134. The cover sheet also contains an audit number 136. In addition, if desired, the cover sheet can also contain the serial number 138 which is printed on each bingo face. The cover sheet; or each additional sheet, can also contain the name of the hall at which the bingo game is to be played, as identified by the numeral 140. Finally, the date on which the game is to be played can also be printed on one or more sheets of the booklet, as identified by the numeral 142.

If desired, the audit coding, which can comprise one or more of the audit number 136, name of the hall 140, date 142 or game number 144, or even other types of indicia, can be printed in an ink which fluoresces under ultra violet light. Such coding would be invisible under ambient light and would only become visible when an ultra violet light was shined on it. The coding could then serve as a security feature for the booklet, or a particular page of the booklet, when a player presented a purportedly winning bingo face.

Beneath the cover sheet would be the remainder of sheets in the booklet. The remaining sheets could all be bingo faced sheets. Alternatively, one or more additional sheets of advertising material or other types of sheets can be interspersed in the bingo booklet. If desired, page numbering could be provided only on those sheets of the booklet which have bingo faces on them and not on those sheets which contain only advertising material. Alternatively, page numbering could be provided on every sheet. Similarly, an audit number can be printed on every sheet of the booklet or only on those sheets which have bingo faces on them.

While there has been described and illustrated a preferred embodiment of the present invention, it is apparent that numerous alterations and modifications will occur to others upon the reading and understanding of this specification. It is intended to include all such modifications and alterations insofar as they come within the scope of the appended claims or the equivalents thereof.

What is claimed is:

1. A bingo game booklet comprising:

a cover sheet;

a first sheet including at least one bingo face;

a first serial number located on each bingo face of said first sheet, wherein said first serial number is identical on each bingo face of said first sheet;

a second sheet located below said first sheet, said second sheet including at least one bingo face;

a second serial number located on each bingo face of said second sheet, wherein said second serial number is identical on each bingo face of said second sheet and said second serial number is identical to said first serial number;

a connecting element for connecting an edge of said cover sheet to an edge of said first sheet and an edge of said second sheet to form the booklet;

an audit coding located on said cover sheet, wherein said audit coding identifies the booklet, wherein said audit coding is also located on each of said first and second sheets of the booklet and wherein said audit coding is identical on said first and second sheets and on said cover sheet; and, a page identifier printed on each of said first and second sheets wherein consecutive identifiers are employed for said first and second sheets of the booklet.

2. The booklet of claim 1 further comprising:

a first indicium located on said first sheet for designating the at least one bingo face of said first sheet; and, a second indicium located on said second sheet for designating the at least one bingo face of said second sheet, wherein said first and second indicia are different.

3. The booklet of claim 1 wherein said cover sheet includes at least one bingo face and a third serial number is located on each bingo face of said cover sheet, wherein said third serial number is identical on each bingo face to said first and second serial numbers.

4. The booklet of claim 2 wherein said first and second indicia each comprise a border of a different color extending at least partially around the bingo face.

5. The booklet of claim 2 wherein said first and second indicia comprise borders of different configurations extending at least partially around the bingo face.

6. The booklet of claim 1 wherein said audit coding comprises a bar code.

7. The booklet of claim 6 wherein said bar code contains said first serial number and information relating to a cut type for the booklet.

8. The booklet of claim 1 wherein said audit coding comprises a location identifier.

9. The booklet of claim 1 wherein said audit coding comprises a date.

10. The booklet of claim 1 wherein said connecting element comprises a layer of adhesive and further comprising an adhesive-resistant coating located on at least a portion of said top sheet.

11. The booklet of claim 1 further comprising a series identification symbol provided on each bingo face on said first and second sheets.

12. A bingo game booklet comprising:

a plurality of sheets, at least some of said sheets of said plurality of sheets including at least one bingo face;

a serial number located on each bingo face of said at least some of said sheets of said plurality of sheets, wherein said serial number on each bingo face is identical;

an audit coding located on said at least some of said sheets of said plurality of sheets, wherein said audit coding is identical for each sheet of said at least some of said sheets of said plurality of sheets;

a game identifier located on each sheet of said plurality of sheets, said page identifier being consecutive on said plurality of sheets; and, a connecting element for connecting an edge of each sheet of said plurality of sheets together to form the booklet.

13. The booklet of claim 12 wherein said connecting element comprises an adhesive and further comprising an adhesive-resistant coating located adjacent the adhesive positioned on the edge of the top sheet of the booklet.

14. The booklet of claim 12 further comprising a plurality of indicia, one located on each bingo face of said at least some of said sheets of said plurality of sheets, wherein said indicia are identical for each bingo face of a particular sheet and are different for each sheet of said at least some of said sheets of said plurality of sheets.

15. The booklet of claim 12 wherein said audit coding comprises a location identifier.

16. The booklet of claim 12 wherein said audit coding comprises a date.

17. The booklet of claim 12 wherein said audit coding comprises a game number.

18. The booklet of claim 12 wherein said audit coding comprises a bar code.

19. The booklet of claim 12 wherein said audit coding is located on each sheet of said plurality of sheets.

20. A stack of bingo game booklets comprising:

a first bingo game booklet comprising:

a top sheet including at least one bingo face, a first serial number located on each bingo face of said top sheet, wherein said first serial number is identical on each bingo face of said top sheet, a second sheet located below said top sheet, said second sheet including at least one bingo face, a second serial number located on each bingo face of said second sheet, wherein said second serial number is identical on each bingo face of said second sheet and said second serial number is identical to said first serial number, a first, identical, audit number located on said top sheet and on said second sheet of said first bingo game booklet; and a second bingo game booklet comprising:

a top sheet including at least one bingo face, a third serial number located on each bingo face of said top sheet, wherein said third serial number is identical on each bingo face of said top sheet and said third serial number is identical to said first and second serial numbers, a second sheet located below said top sheet, said second sheet including at least one bingo face, a fourth serial number located on each bingo face of said second sheet, wherein said fourth serial number is identical on each bingo face of said second sheet and said fourth serial number is identical to said first, second and third serial numbers, and a second, identical, audit number located on said top sheet and on said second sheet of said second bingo game booklet, wherein said second audit number is different from said first audit number; and, a connecting element for connecting an edge of each sheet of said first and second booklets together to form the stack, wherein each of said first and second bingo game booklets further comprises a game identification sequence wherein said top sheet is identified with a first identifier and the second sheet is identified with the next succeeding identifier for each of said booklets.

21. The stack of bingo game booklets of claim 20 wherein said connecting element comprises an adhesive layer and further comprising an adhesive resistant coating located on a portion of said top sheet of each of said first and second bingo game booklets, adjacent said adhesive layer, to prevent adhesive from flowing onto said top sheets and allow easy separation of said first bingo game booklet from said second bingo game booklet.

22. The stack of bingo game booklets of claim 20 wherein said second bingo game booklet is positioned directly behind said first bingo game booklet in the stack of booklets and said second audit number is different from said first audit number.

23. A bingo game booklet comprising:

a cover sheet;

a first sheet including at least one bingo face;

a first serial number located on each bingo face of said first sheet, wherein said first serial number is identical on each bingo face of said first sheet:

a second sheet located below said first sheet, said second sheet including at least one bingo face;

a second serial number located on each bingo face of said second sheet, wherein said second serial number is identical on each bingo face of said second sheet and said second serial number is identical to said first serial number;

a connecting element for connecting an edge of said cover sheet to an edge of said first sheet and an edge of said second sheet to form the booklet;

an audit coding located on said cover sheet, wherein said audit coding identifies the booklet and wherein said audit coding is located on said cover sheet, said first sheet and said second sheet; and, a page number printed on each of said first and second sheets wherein consecutive numerals are employed as the page number for said first and second sheets of the booklet.

24. The booklet of claim 23 further comprising:

a first indicium located on said first sheet for designating the at least one bingo face of said first sheet; and, a second indicium located on said second sheet for designating the at least one bingo face of said second sheet, wherein said first and second indicia are different.

25. The booklet of claim 23 wherein said cover sheet includes at least one bingo face and a third serial number is located on each bingo face of said cover sheet, wherein said third serial number is identical on each bingo face to said first and second serial numbers.

26. The booklet of claim 23 wherein said audit coding comprises a bar code.

27. The booklet of claim 23 wherein said connecting element comprises a layer of adhesive and further comprising an adhesive-resistant coating located on at least a portion of said top sheet.

* * * * *

UNITED STATES PATENT AND TRADEMARK OFFICE

CERTIFICATE OF CORRECTION

PATENT NO. : 5,779,274
DATED : July 14, 1998
INVENTOR(S) : John E. Gallagher, Jr., et al.

It is certified that error appears in the above-indentified patent and that said Letters Patent is hereby corrected as shown below:

Claim 12, line 13, delete " page" and insert therefor --game--

Signed and Sealed this

Seventeenth Day of November, 1998

Attest:

Bruce Lehman

BRUCE LEHMAN

*Attesting Officer* *Commissioner of Patents and Trademarks*